United States Patent
Yoon et al.

(10) Patent No.: US 6,337,923 B1
(45) Date of Patent: Jan. 8, 2002

(54) COLOR CORRECTION APPARATUS FOR MINIMIZING METAMERISM OF COLOR SCANNER AND METHOD THEREFOR

(75) Inventors: Chang-Rack Yoon; Maeng-Sub Cho; Byoung-Ho Kang, all of Taejon; Jin-Seo Kim, Seoul; Hong-Kee Kim, Taejon; Kyu-Seo Han, Incheon, all of (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/205,615

(22) Filed: Dec. 4, 1998

(30) Foreign Application Priority Data

Oct. 15, 1998 (KR) .............................. 98-43241

(51) Int. Cl.$^7$ .............................. H04N 1/46; G03F 3/08; G06K 9/00
(52) U.S. Cl. ..................... 382/167; 358/516; 358/520
(58) Field of Search ................................ 382/167, 162; 358/504, 509, 520, 530, 516

(56) References Cited

U.S. PATENT DOCUMENTS

| | | | | |
|---|---|---|---|---|
| 3,601,589 A | * | 8/1971 | McCarty ..................... | 235/150 |
| 5,001,663 A | | 3/1991 | Parulski et al. ............. | 364/760 |
| 5,068,718 A | | 11/1991 | Iwabe et al. ................. | 358/27 |
| 5,530,563 A | * | 6/1996 | Zimmermann et al. ...... | 358/517 |
| 5,668,596 A | | 9/1997 | Vogel ......................... | 348/222 |
| 5,739,928 A | * | 4/1998 | Scott .......................... | 358/520 |
| 6,084,693 A | * | 7/2000 | Zimmermann et al. ...... | 358/534 |
| 6,129,664 A | * | 10/2000 | Macfarlane et al. ........ | 600/315 |

OTHER PUBLICATIONS

Methods for characterizing colour scanners and digital cameras; Tony Johnson; 1996; pp. 183–191.

* cited by examiner

Primary Examiner—Jerome Grant, II
(74) Attorney, Agent, or Firm—Antonelli, Terry, Stout & Kraus, LLP

(57) ABSTRACT

A color correction apparatus for minimizing a metamerism of a color scanner and a method therefor are disclosed. The apparatus includes a color measuring unit for measuring a light splitting reflection value of a color sample; a metamerism minimizing color correction unit for receiving R, G, B color values of the color sample and a light splitting reflection value inputted from the color measuring unit, obtaining a metamerism minimizing color correction parameter and converting the R, G, B color values inputted from a color scanner into a light splitting reflection value using the metamerism minimizing color correction parameter; a color value converting unit for determining a color value conversion parameter selection value in accordance with an externally inputted selection signal and converting a light splitting reflection value inputted from the metamerism minimizing color correction unit into a standard color value using the color value conversion parameter in accordance with the determined color value conversion parameter selection value; and a storing unit for providing the stored color value conversion parameter in accordance with the color value conversion parameter selection value received from the color value conversion unit and storing the metamerism minimizing color correction parameter obtained by the metamerism minimizing color correction unit. Therefore, it is possible to minimizing the metamerism of a color scanner.

6 Claims, 3 Drawing Sheets

COLOR CORRECTION APPARATUS FOR MINIMIZING METAMERISM OF COLOR SCANNER AND METHOD THEREFOR

BACKGROUND OF THE INVENTION

1. Field of the Invention

The present invention relates to a color correction apparatus and a method thereof, and in particular to an improved color correction apparatus and a method thereof which are capable of significantly minimizing a metamerism occurring in accordance with a light, observing angle and material in red, green and blue color values generated by a color scanner.

2. Description of the Conventional Art

FIG. 1 illustrates a digital imaging operation with respect to colors including a metamerism using a conventional color scanner.

As shown therein, a color A 111 having a metamerism and a color B 112 having a metamerism have different light splitting reflection values, but are recognized as the identical color under a predetermined observing environment. However, the color A'131 which does not have the metamerism and the color B'132 which does not have the metamerism after a scanning operation is performed using the color scanner 120 may not be recognized as the identical color under the same observing environment for the reason that an image input apparatus such as the color scanner 120 resolves the image into red, green and blue components and digitally image-processes the image using a n-number of bits to an integer value from 0 to ($2^N$–1) for thereby generating a color recognition capacity of people and other colors.

In the digital image process of the image using a conventional color scanner, the user uses a color matching apparatus and technique for matching the original image and the color. The metamerism problem that other colors are recognized as the same color in accordance with the observing environment such as light, material and observing angle, is not recognized as an important matter.

Therefore, when observing the colors after the colors having the metamerism are digitally image-processed using a color scanner under a predetermined observing environment, two colors may not be matched.

In addition, recently, the electronic image industry using the computer is sharply increased, and the publication and advertising based on the DTP (Desk Top Publishing) is also increased. Therefore, in the industry, a color scanner having a large capacity is increasingly needed. However, the color input capacity of the color scanner is not fully satisfied.

The digital image obtained by the color scanner in the Ad fabrication, printing and publication industry is outputted to an output apparatus, and much manpower and time are needed for matching the original image with the colors for thereby increasing the time and manpower consumption, so that the productivity of the system is decreased.

In the case of the home shopping, the product information is converted to a digital image using the color scanner. In this case, since the conventional scanner does not fully support various color resolutions, the customer may return the product due to the different colors due to an inaccurate color resolution.

SUMMARY OF THE INVENTION

Accordingly, it is an object of the present invention to provide a color correction apparatus for minimizing a metamerism of a color scanner and a method therefor which overcome the aforementioned problems encountered in the conventional art.

It is another object of the present invention to provide a color correction apparatus for minimizing a metamerism of a color scanner and a method therefor which are capable of minimizing the metamerism of a color scanner for providing a digital image in which the metamerism matching with a color information which is recognizable by people by converting a red, green and blue color value of the color scanner to a light splitting reflection value corresponding thereto and converting the converted light splitting reflection value to a standard color value (CIE XYZ, CIE L*a*b CIE L*C*h) of the CIE(Commission International Del' Edairange).

In order to achieve the above objects, there is provided a color correction apparatus for minimizing a metamerism of a color scanner which includes a color measuring unit for measuring a light splitting reflection value of a color sample; a metamerism minimizing color correction unit for receiving R, G, B color values of the color sample and a light splitting reflection value inputted from the color measuring unit, obtaining a metamerism minimizing color correction parameter and converting the R, G, B color values inputted from a color scanner into a light splitting reflection value using the metamerism minimizing color correction parameter; a color value converting unit for determining a color value conversion parameter selection value in accordance with an externally inputted selection signal and converting a light splitting reflection value inputted from the metamerism minimizing color correction unit into a standard color value using the color value conversion parameter in accordance with the determined color value conversion parameter selection value; and a storing unit for providing the stored color value conversion parameter in accordance with the color value conversion parameter selection value received from the color value conversion unit and storing the metamerism minimizing color correction parameter obtained by the metamerism minimizing color correction unit.

In order to achieve the above objects, there is provided a color correction method for minimizing a metamerism of a color scanner which includes the steps of a first step for determining a metamerism minimizing color correction parameter using a measured light splitting reflection value and R, G, B color values of the color sample; a second step for converting the R, G, B color value of an object inputted through a color scanner into a light splitting reflection value using the determined metamerism minimizing color correction parameter; and a third step for converting the converted light splitting reflection value into a standard color value using the selected color value conversion parameter after the color value conversion parameter is selected.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims as a result of the experiment compared to the conventional arts.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The color correction apparatus for minimizing the metamerism of a color scanner and a method therefor according to the present invention will be explained with reference to the accompanying drawings.

Figure 1:
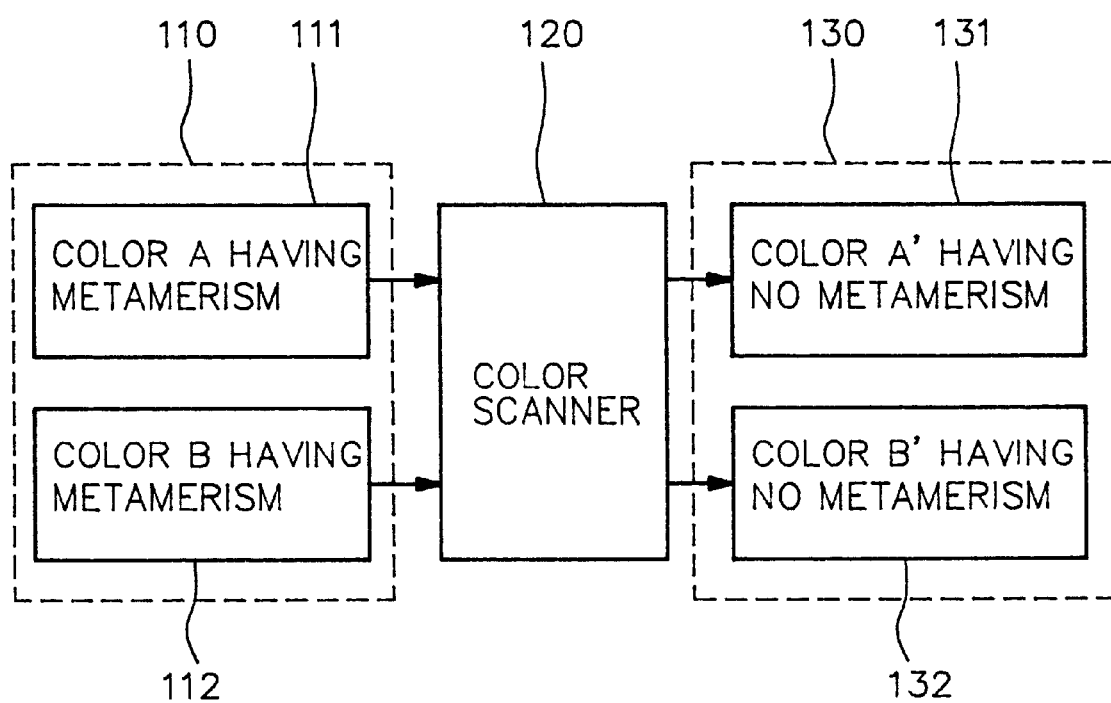
FIG. 1 is a view illustrating a digital imaging process with respect to colors having a metamerism using a conventional color scanner.
Figure 2:
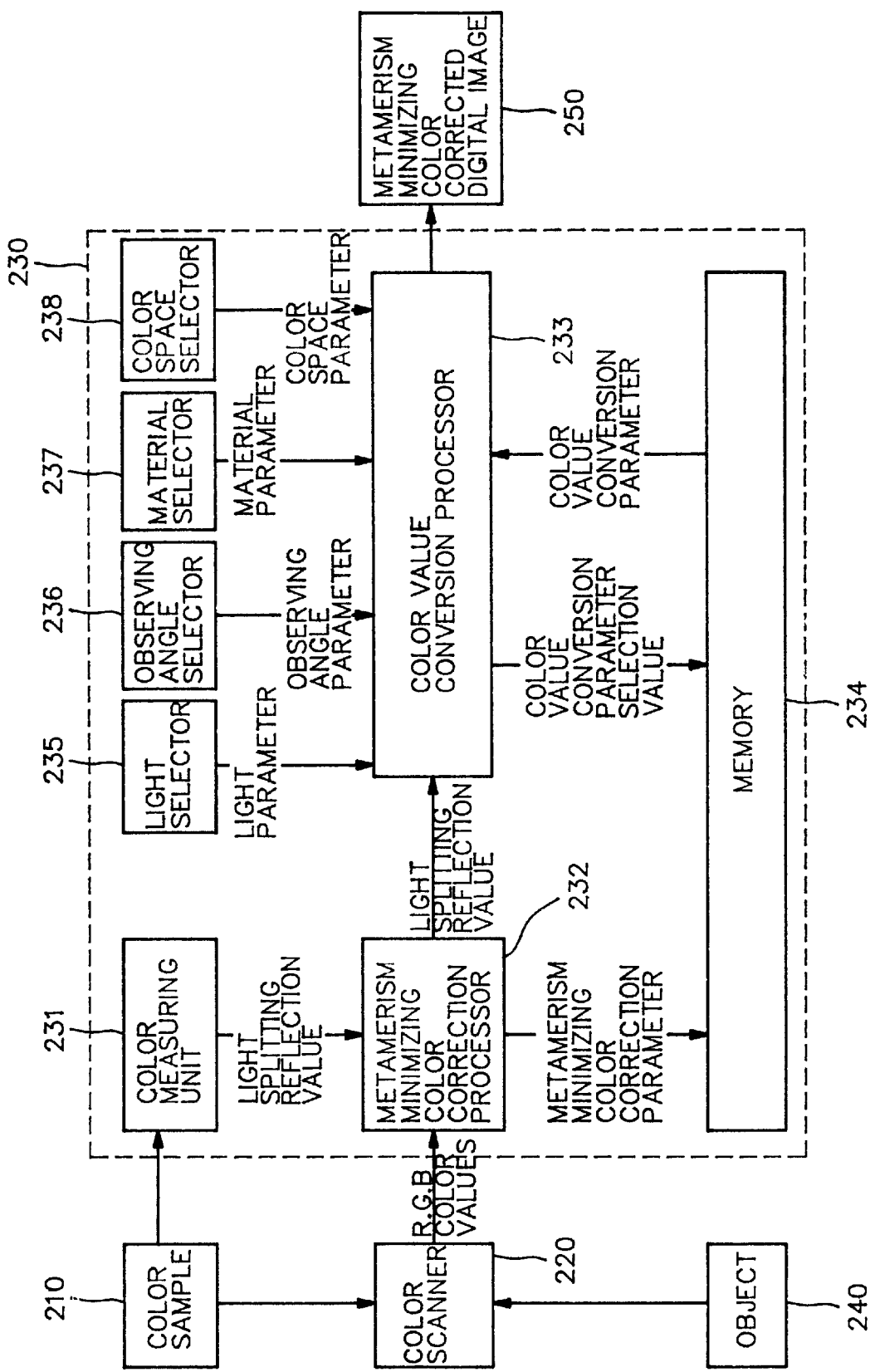
FIG. 2 is a block diagram illustrating the construction of a color correction apparatus for minimizing a metamerism of a color scanner according to the present invention.

FIG. 2 illustrates the construction of a color correction apparatus for minimizing a metamerism of a color scanner according to the present invention.

As shown therein, the color correction apparatus 230 for minimizing the metamerism of a color scanner according to the present invention includes a color measuring unit 231 for measuring a light splitting reflection value corresponding to R, G, B color values of a color sample 210 obtained by a color scanner 220, a metamerism minimizing color correction processor 232 for obtaining a metamerism minimizing color correction parameter which converts the R, G, B color values into a light splitting reflection value and converting the R, G, B color value of a digital image to a light splitting reflection value using the metamerism minimizing color correction parameter, a conversion processor 233 for converting the converted light splitting reflection value to a standard color value of the CIE, a light selector 235 for selecting an environment determination parameter used for converting the light splitting reflection value to a standard color value of the CIE, an observing angle selector 236, a material selector 237, a color space selector 238, and a memory 234 for storing the metamerism minimizing color correction parameter and the color value converting parameter.

The operation of the color correction apparatus for minimizing the metamerism of a color scanner according to the present invention will be explained with reference to the accompanying drawings.

First, the color measuring unit 231 measures the light splitting value corresponding to the R, G, B color values of the color sample 210 obtained by the color scanner 220 and outputs the thusly measured value to the metamerism minimizing color correction processor 232.

The metamerism minimizing color correction processor 232 receives the light splitting value of the color sample 210 measured by the color measuring unit 231 and the R, G, B color values of the color sample 210 obtained by the color scanner 220 and generates a metamerism minimizing color correction parameter converting the R, G, B color values into the light splitting reflection value and stores the thusly generated values into the memory 234. In addition, the R, G, B color values of an object 240 obtained by the color scanner 220 are converted into the light splitting reflection value using the metamerism minimizing color correction parameter stored in the memory 234 and are outputted to the color value converting processor 233.

The operation that the metamerism minimizing color correction parameters are determined will be explained in detail with reference to FIG. 3.

In addition, the color value converting processor 233 determines a color value converting parameter selection value suing an environment determination parameter such as a light parameter, an observing angle parameter, a material parameter and a color space parameter selected by the material selector 237 and the color space selector 238 and loads the color value converting parameter stored in the memory 234 in accordance with the determined color value converting parameter selection value.

The color value converting processor 233 converts the light splitting reflection value to a standard color value of the CIE using the loaded color value converting parameter and generates a digital image 250 in which the metamerism having the same color as the object 240 is minimized for thereby outputting the digital image 250.

At this time, the selection of the light, observing angle, material and color space of the light selector 235, the observing angle selector 236, the material selector 237 and the color space selector 238 are determined in accordance with an externally inputted selection signal.

Figure 3:
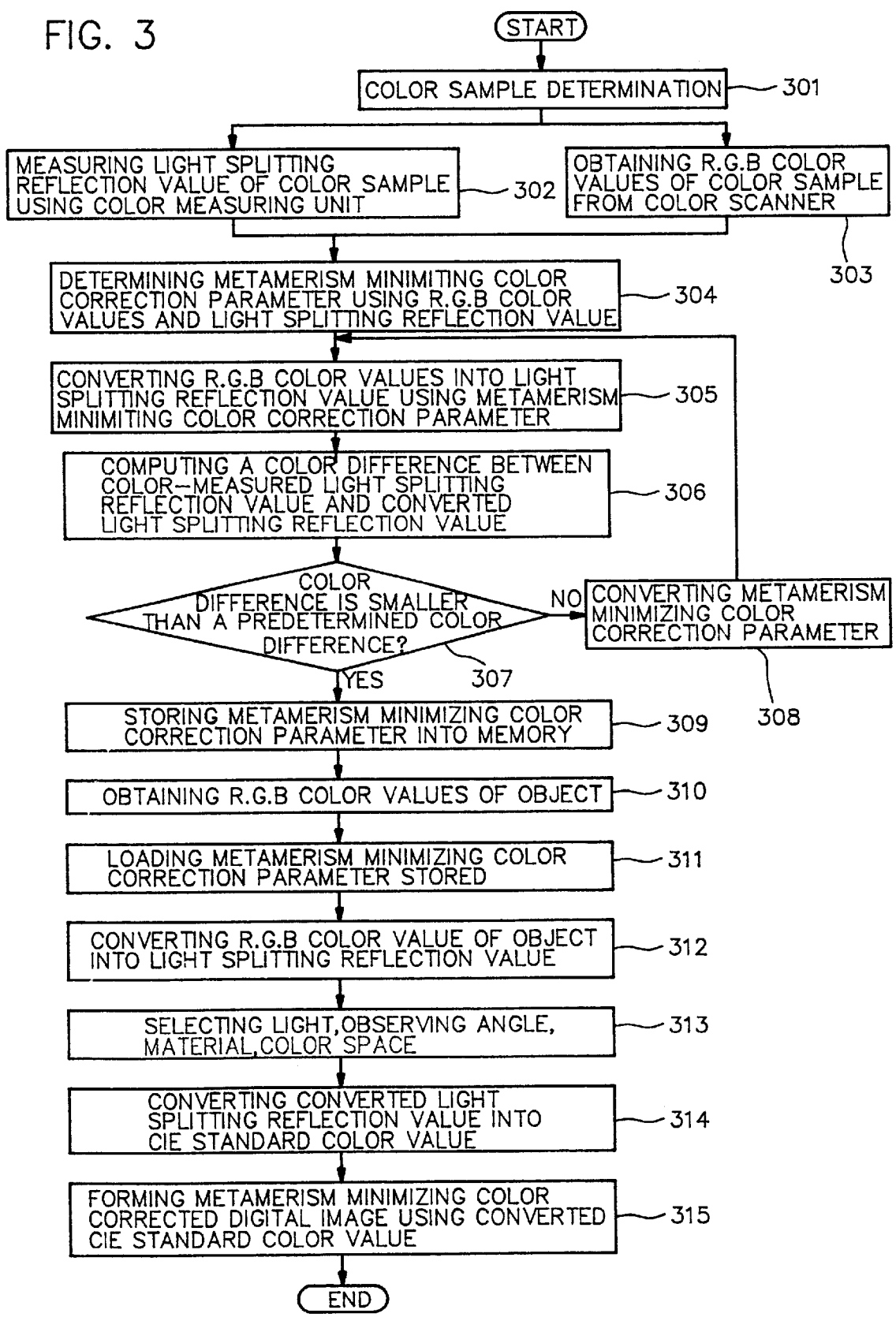
FIG. 3 is a flow chart illustrating a color correction method for minimizing a metamerism of a color scanner according to the present invention.

FIG. 3 is a flow chart illustrating a color correction method for minimizing a metamerism of a color scanner according to the present invention.

As shown therein, the steps from a color sample determination step 301 to a step 309 for storing the metamerism minimizing color correction parameter into the memory are for obtaining the metamerism minimizing color correction parameter using the color sample, and the step from a step 310 for obtaining a R, G, B color value of the object to a step 315 for forming a digital image in which the metamerism is minimized and the color is corrected using the standard color value of the CIE is for performing the metamerism minimizing color correction with respect to the object and obtaining a digital image in which the metamerism is minimized, and the color is corrected.

As shown therein, in the color correction method for minimizing the metamerism of the color scanner according to the present invention, the color sample is determined (301) for correcting the colors, and the color samples are formed of a plurality of colors which may be a representative of the color space in the uniform color space.

The light splitting reflection value of the color sample is measured using the measuring unit in Step 302 for thereby obtaining a light split reflection value of the selected color sample. In addition, the R, G, B color values of the selected color sample are obtained using the color scanner in Step 303.

Next, the metamerism minimizing color correction processor determines the metamerism minimizing color correction parameter using the R, G, B color values and the measured light splitting reflection value in Step 304.

The conversion equation used for determining the metamerism minimizing color correction parameters using the metamerism minimizing color correction processor may be expressed as follows:

$$R(\lambda_1) = a_{1.1}C_1 + a_{1.2}C_2 + \ldots + a_{1.m-1}C_{m-1} + a_{1.m}C_m$$

$$R(\lambda_2) = a_{2.1}C_1 + a_{2.2}C_2 + \ldots + a_{2.m-1}C_{m-1} + a_{2.m}C_m$$

.

.

.

$$R(\lambda_{n-1}) = a_{n-1.1}C_1 + a_{n-1.2}C_2 + \ldots + a_{n-1.m-1}C_{m-1} + a_{n-1.m}C_m$$

$$R(\lambda_n) = a_{n.1}C_1 + a_{n.2}C_2 + \ldots + a_{n.m-1}C_{m-1} + a_{n.m}C_m \qquad \text{[Equation 1]}$$

where $R(\lambda_1) \ldots R(\lambda_n)$ represents the light splitting reflection value, $C_1 \ldots C_m$ represent the values based on the R, G, B values, and $a_{1,1} \ldots a_{n,m}$ represent the metamerism minimizing color correction parameter.

In addition, the metamerism minimizing color correction process receives the R, G, B color values of the color sample obtained by the color scanner using the determined metamerism minimizing color correction parameter and converts the same into the light splitting reflection value in Step 305.

Thereafter, the metamerism minimizing color correction process computes the difference between the converted light splitting reflection value and the measured light splitting reflection value in Step 306.

At this time, the conversion equation for computing the above-described difference using the metamerism minimizing color correction processor may be expressed as follows:

$$X \sum_{360}^{780} Wx(\lambda)R(\lambda)\Delta\lambda \quad \text{[Equation 2]}$$

$$Y = \sum_{360}^{780} Wy(\lambda)R(\lambda)\Delta\lambda$$

$$Z = \sum_{360}^{780} Wz(\lambda)R(\lambda)\Delta\lambda$$

$$L^* = 116f(Y/Y_n) - 16$$

$$a^* = 500[f(X/X_n) - f(Y/Y_n)]$$

$$b^* = 200[f(Y/Y_n) - f(Z/Z_n)]$$

here, $$f(X/X_n) = (X/X_n)^{1/3} \quad X/X_n < 0.008856$$

$$f(X/X_n) = 7.787(X/X_n) + 16/116 \quad X/X_n \leq 0.008856$$

$$f(Y/Y_n) = (Y/Y_n)^{1/13} \quad Y/Y_n < 0.008856$$

$$f(Y/Y_n) = 7.787(Y/Y_n) + 16/116 \quad Y/Y_n \leq 0.008856$$

$$f(Z/Z_n) = (Z/Z_n)^{1/3} \quad Z/Z_n < 0.008856$$

$$f(Z/Z_n) = 7.787(Z/Z_n) + 16/116 \quad Z/Z_n \leq 0.008856$$

$$\Delta E^* ab = (L^*_2 - L^*_1)^2 + (a^*_2 - a^*_1)^2 + (b^*_2 - b^*_1)^2$$

Next, the metamerism minimizing color correction processor judges if the obtained color difference $\Delta E^*_{ab}$ is smaller than the desired value.

As a result of the judgement, if the obtained color difference is larger than the desired value, the metamerism minimizing color correction processor changes the Equation 1 for thereby changing the metamerism minimizing color correction parameter in Step 308 and repeatedly performs the steps from the step 305 in which the R, G, B color values are converted into the light splitting value using the metamerism minimizing color correction parameter.

As a result of the judgement, if the obtained color difference is smaller than the desired value, the metamerism minimizing color correction processor stores the metamerism minimizing color correction parameter.

Thereafter, the digital image of the object is formed using the color scanner, and the R, G, B color values of each pixel of the digital image are obtained in Step 310.

Next, the metamerism minimizing color correction processor loads the metamerism minimizing color correction parameter stored in the memory and converts the R, G, B color values of the object into the light splitting reflection value using the thusly loaded metamerism minimizing color correction parameter in Step 312.

In addition, the environment determination parameter such as a light parameter, an observing angle parameter, a material parameter, a color space parameter, etc. using the light selector, the observing angle selector, the material selector, and the color space selector is selected for converting the converted light splitting reflection value into the standard color value of the CIE in Step 313, and the color value conversion parameter selection value is obtained for selecting the color value conversion parameter using the selected environment determination parameter.

Next, the color value conversion processor loads the color value conversion parameter from the memory based on the obtained color value conversion parameter selection value and converts the light splitting reflection value obtained using the loaded color value conversion parameter into the standard color value of the CIE in Step 314.

In addition, the color value conversion processor forms the digital image, in which the metamerism is minimized and the color is corrected, using the standard color value of the CIE in Step 315.

As described above, in a color correction apparatus for minimizing the metamerism of a color scanner and a method therefor according to the present invention, it is possible to minimize the metamerism problem which occurs when a digital image of the conventional color scanner is formed for thereby obtaining a digital image having the same color as the original color by storing the digital image in which the metamerism is minimized and the color is corrected.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A color correction apparatus, comprising:
   a color measuring means for measuring a light splitting reflection value of a color sample;
   a metamerism minimizing color correction means for receiving R, G, B color values of the color sample and a light splitting reflection value inputted from the color measuring means, obtaining a metamerism minimizing color correction parameter and converting the R, G, B color values inputted from a color scanner into a light splitting reflection value using the metamerism minimizing color correction parameter;
   a color value converting means for determining a color value conversion parameter selection value in accordance with an externally inputted selection signal and converting a light splitting reflection value inputted from the metamerism minimizing color correction means into a standard color value using the color value conversion parameter in accordance with the determined color value conversion parameter selection value; and
   a storing means for providing the stored color value conversion parameter in accordance with the color value conversion parameter selection value received from the color value conversion means and storing the metamerism minimizing color correction parameter obtained by the metamerism minimizing color correction means.

2. The apparatus of claim 1, wherein said metamerism minimizing color correction means determines the metamerism minimizing color correction parameter using the color value of the color sample and the light splitting reflection value inputted from the color measuring means, converts the R, G, B color values inputted from the color scanner into a light splitting reflection value using the determined metamerism minimizing color correction parameter, and converts the determined metamerism minimizing color correction parameter using a difference between the converted light splitting reflection value and the measured light splitting reflection value for thereby obtaining a metamerism minimizing color correction parameter.

3. The apparatus of claim 1, wherein said color value converting means includes:

a light selector for selecting a light parameter used for converting the light splitting reflection value into a standard color value in accordance with an externally inputted selection signal;

an observing angle selector for selecting an observing angle parameter used for converting the light splitting reflection value into a standard color value in accordance with an externally inputted selection signal;

a material selector for selecting a material parameter used for converting the light splitting reflection value into a standard color value in accordance with an externally inputted selection signal;

a color space selector for selecting a color space parameter used for converting the light splitting reflecting value into a standard color value in accordance with an externally inputted selection signal; and a color value conversion processor for receiving the selected light parameter, observing angle parameter, material parameter and color space parameter, determining a color value conversion parameter selection value, receiving the color value conversion parameter from the storing means in accordance with the determined color value conversion parameter selection value, and converting the light splitting reflection value inputted from the metamerism minimizing color correction means into a standard color value.

4. In a metamerism minimizing color correction method adapted to a color correction apparatus including a color measuring means for measuring a light splitting reflection value of a color sample, a metamerism minimizing color correction means for minimizing the metamerism and a color value conversion means and storing means for converting the color value, a color correction method, comprising the steps of:

a first step for determining a metamerism minimizing color correction parameter using a measured light splitting reflection value and R, G, B color values of the color sample;

a second step for converting the R, G, B color value of an object inputted through a color scanner into a light splitting reflection value using the determined metamerism minimizing color correction parameter; and a third step for converting the converted light splitting reflection value into a standard color value using the selected color value conversion parameter after the color value conversion parameter is selected.

5. The method of claim 4, wherein said first step includes:

a fourth step for receiving the R, G, B color values of the color sample obtained from the color scanner using the determined metamerism minimizing color correction parameter and converting the same into a light splitting reflection value;

a fifth step in which the metamerism minimizing color correction means computes a difference between the converted light splitting reflection value and the measured light splitting reflection value;

a sixth step for judging whether the obtained color difference is smaller than a predetermined value;

a seventh step for repeatedly performing the steps from the fourth step after the metamerism minimizing color correction means converts the metamerism minimizing color correction parameter when the color difference is larger than the predetermined value as a result of the judgement of the sixth step; and an eighth step for storing the generated metamerism minimizing color correction parameter generated by the metamerism minimizing color correction means into the storing means when the color difference is smaller than the predetermined value as a result of the judgement of the sixth step.

6. The method of claim 4, wherein said third step includes:

a ninth step for selecting parameters concerning a light, observing angle, material and color space using a light selector, observing angle selector, material selector, and color space selector of the color value converting means;

a tenth step in which the color value conversion processor of the color value converting means determines a color value converting parameter selection value using the light, observing angle, material, and color space;

an eleventh step for receiving the color value conversion parameter from the storing means in accordance with the color value conversion parameter selection value and converting the converted light splitting reflection value into a standard value; and a twelfth step for forming a digital image, in which the metamerism is minimized, and the color is corrected, using the standard color value obtained by the color value conversion processor.

* * * * *